(12) United States Patent
Amemiya et al.

(10) Patent No.: US 7,430,855 B2
(45) Date of Patent: Oct. 7, 2008

(54) MUFFLING APPARATUS HAVING EXHAUST EMISSION PURIFYING FUNCTION

(75) Inventors: Tomoko Amemiya, Ageo (JP); Takefumi Mochizuki, Ageo (JP); Isamu Kanaya, Ageo (JP); Daisuke Shirai, Yokohama (JP); Hitoshi Hiramoto, Yokohama (JP)

(73) Assignees: Nissan Diesel Motor Co., Ltd., Saitama (JP); Tokyo Roki Co., Ltd., Kanagawa (JP)

( * ) Notice: Subject to any disclaimer, the term of this patent is extended or adjusted under 35 U.S.C. 154(b) by 0 days.

(21) Appl. No.: 11/525,077

(22) Filed: Sep. 22, 2006

(65) Prior Publication Data
US 2007/0012035 A1    Jan. 18, 2007

Related U.S. Application Data

(63) Continuation of application No. PCT/JP2005/004542, filed on Mar. 15, 2005.

(30) Foreign Application Priority Data
Mar. 25, 2004  (JP)  ............... 2004-089912

(51) Int. Cl.
*F01N 3/00*  (2006.01)
(52) U.S. Cl. ............... 60/286; 60/296; 60/301; 60/303; 60/317
(58) Field of Classification Search ............. 60/286, 60/296, 301, 303, 317, 322; 181/212, 221, 181/222, 259, 260, 261
See application file for complete search history.

(56) References Cited

U.S. PATENT DOCUMENTS

| | | | | |
|---|---|---|---|---|
| 5,209,062 A | * | 5/1993 | Vollenweider | ............... 60/280 |
| 6,312,650 B1 | | 11/2001 | Frederiksen et al. | |
| 6,442,933 B2 | * | 9/2002 | Rusch | ............... 60/286 |
| 7,032,566 B2 | * | 4/2006 | Cavanagh et al. | ........... 123/299 |
| 7,065,958 B2 | * | 6/2006 | Funk et al. | ................. 60/286 |

FOREIGN PATENT DOCUMENTS

| | | |
|---|---|---|
| EP | 0 896 831 A1 | 2/1999 |
| EP | 1 050 670 A2 | 11/2000 |
| JP | 11-125110 A | 5/1999 |
| JP | 2000-27627 A | 1/2000 |
| JP | 2000-510215 A | 8/2000 |
| JP | 6-248940 A | 9/2004 |
| WO | WO 97/43528 A1 | 11/1997 |

* cited by examiner

*Primary Examiner*—Thomas Denion
*Assistant Examiner*—Diem Tran
(74) *Attorney, Agent, or Firm*—Baker & Hostetler LLP (57) ABSTRACT

A muffling apparatus 1 of the present invention having an exhaust emission purifying function, including a turning portion 8 in an inside of an exhaust gas flow passage, and having an injection nozzle 12 disposed in an upstream side exhaust gas flow passage 9 of the turning portion 8, for injection-supplying a liquid reducing agent; and a reduction catalytic converter 13 disposed in a downstream side exhaust gas flow passage 10 of the turning portion 8, for reductively purifying nitrogen oxides with the liquid reducing agent. The apparatus further includes a diffusing member 15, which generates a vortex flow of a gas traveling in a vertical plane of the turning portion 8 to diffuse the liquid reducing agent.

5 Claims, 6 Drawing Sheets

MUFFLING APPARATUS HAVING EXHAUST EMISSION PURIFYING FUNCTION

This application is a continuation of PCT/JP2005/004542, filed on Mar. 15, 2005.

BACKGROUND OF THE INVENTION

1. Field of the Invention

The present invention relates to a muffling apparatus having an exhaust emission purifying function of reducing $NO_x$ in the exhaust gas from, for example, a vehicle engine and the like to purify the exhaust gas using a liquid reducing agent and a reduction catalytic converter, and in particular, to a technology for improving the $NO_x$ reduction performance in a muffling apparatus having a structure for forcibly turning a flow direction of the exhaust gas back inside thereof and capable of exhibiting an exhaust emission purifying function in addition to the muffling function.

2. Description of the Related Art

As an exhaust emission purifying system for eliminating $NO_x$ contained in the exhaust gas of an engine, there has been proposed an exhaust emission purifying apparatus for injection-supplying a liquid reducing agent to a position located upstream of a reduction catalytic converter disposed in an engine exhaust system, so that $NO_x$ in the exhaust gas and the reducing agent is subjected to the catalytic-reaction to each other, thereby purifying $NO_x$ into a harmless component (refer to Japanese Unexamined Patent Publication No. 2000-27627).

In order to install such an exhaust emission purifying apparatus on a vehicle, such as a motor tractor, which is restricted in the length of an exhaust pipe thereof since the vehicle length thereof is short, there has been developed a muffling apparatus having an exhaust emission purifying function in addition to its inherent muffling function, due to incorporating therein an exhaust emission purifying apparatus.

As a muffling apparatus installed on a vehicle, such as a motor tractor, which is restricted in the length of an exhaust pipe thereof, there is proposed an apparatus having a structure in which a turning portion for forcibly turning the exhaust gas flow back to an exhaust gas flow passage therein is disposed, so that the entered exhaust gas is led to the exhaust gas flow passage on an upstream side of the turning portion, and thereafter, is forcibly turned back at the turning portion and is led to the exhaust gas flow passage on a downstream side to be emitted to the atmosphere. In the above-described exhaust emission purifying apparatus, in order to improve the $NO_x$ purifying efficiency by the reduction catalytic converter, the liquid reducing agent needs to be sufficiently diffused into and to be mixed with the exhaust gas until the liquid reducing agent reaches the reduction catalytic converter, and accordingly, a certain amount of distance is required to be furnished between an injection nozzle for the liquid reducing agent and the reduction catalytic converter. Therefore, in the case where the above-described exhaust emission purifying apparatus is incorporated in the above-described muffling apparatus having the structure in which the turning portion is disposed, it is desirable that the injection nozzle for the liquid reducing agent is disposed on the upstream side exhaust gas flow passage, and the reduction catalytic converter is disposed on the downstream side exhaust gas flow passage.

However, in the muffling apparatus of the structure in which the turning portion is disposed, since the structure thereof is such that the exhaust gas flow direction is forcibly changed at the turning portion, the flow of the exhaust gas flow must become unequal. Accordingly, the flow of the exhaust gas entering into the reduction catalytic converter is inconstant, which causes uneven distribution of the liquid reducing agent when it flows into the reduction catalytic converter and hence, there might be such a possibility that the $NO_x$ purification performance cannot be achieved satisfactorily.

Incidentally, it is possible to obtain a relatively even distribution of the liquid reducing agent in the exhaust gas, if the injection nozzle for the liquid reducing agent, which is arranged to protrude from a flow-passage-wall-face of the exhaust gas to the inside of the passage, is provided to extend in a manner such that a nozzle opening thereof is positioned on the center of the exhaust gas flow passage. Nevertheless, since the injection nozzle is supported by a cantilever supporting structure, there might be a possibility that the injection nozzle is damaged due to the vehicle body vibration or the like, and also, there is a possibility that the heat capacity of the injection nozzle necessarily becomes larger, so that the liquid reducing agent is attached to be accumulated on an inner wall of the injection nozzle due to the exhaust heat, resulting in clogging of the nozzle.

SUMMARY OF THE INVENTION

The present invention has been made in view of the above problems, and has an object to improve the $NO_x$ purification performance in a muffling apparatus having an exhaust emission purifying function, and is formed in a structure thereof capable of generating a vortex in an exhaust gas flow at a turning portion of the flow to promote diffusing of the liquid reducing agent, thereby forcing the exhaust gas flow to be turned back.

In order to achieve the above object, according to the present invention, a muffling apparatus having an exhaust emission purifying function, and including a turning portion formed in an exhaust gas flow passage inside thereof, the apparatus comprising at least: an injection nozzle disposed in a given position of the exhaust gas flow passage on an upstream side of the turning portion, for injection-supplying a liquid reducing agent; and a reduction catalytic converter disposed in a given position of the exhaust gas flow passage on a downstream side of the turning portion, for reductively purifying nitrogen oxides with the liquid reducing agent, and being configured in a manner such that a diffusing member which generates vortex traveling in a vertical direction in the exhaust gas flow at the turning portion to diffuse the liquid reducing agent.

Further, in accordance with the present invention, the diffusing member leads the exhaust gas which flows into the turning portion from the upstream side exhaust gas flow passage, toward a direction in which turning portion wall face extends to be substantially parallel with a flow direction of the exhaust gas.

Furthermore, in accordance with the present invention, the diffusing member is comprised of a ring member in which a plurality of opening portions are formed to be arranged along a circumferential direction thereof, and leads the exhaust gas flowing into the turning portion toward the direction of extension of the turning portion wall face via the above-mentioned opening portions.

Still further, in accordance with the present invention, the plurality of opening portions are formed to be arranged in the circumferential direction of the ring member at a non-uniform distribution. Typically, the plurality of opening portions of the ring member may be arranged on one side in the circumferential direction thereof.

Still further, in accordance with the present invention, the plurality of opening portions are formed to have different diameters among each other.

Moreover, in accordance with the present invention, an oxidation catalytic converter is provided on an upstream side of the injection nozzle, for oxidizing nitrogen monoxide into nitrogen dioxide, and a reducing agent oxidation catalytic converter is provided on a downstream side of the reduction catalytic converter, for oxidation-purifying the liquid reducing agent which has passed through the reduction catalytic converter.

As described in the foregoing, In accordance with the present invention, since the vortex traveling in the vertical direction is generated at the turning portion, the unequal flow of the exhaust gas entering into the reduction catalytic converter is reduced, and also, the diffusion of the liquid reducing agent into the exhaust gas is promoted, so that the distribution of the liquid reducing agent in the exhaust gas is equalized. Therefore, the $NO_x$ purification efficiency in the reduction catalytic converter is increased, and the $NO_x$ purification performance can be improved.

Further, the plurality of opening portions in the ring member serving as the diffusing member are formed to be arranged at non-uniform distribution in the circumferential direction, so that the flow direction of the exhaust gas passed through the plurality of opening portions becomes distorted and unequal. As a result, the vortex traveling in the vertical direction at the turning portion is more readily generated, and the distribution of the liquid reducing agent in the exhaust gas is more prominently equalized, so as to improve the $NO_x$ reduction performance.

Furthermore, since the oxidation catalytic converter is disposed on the exhaust gas flow passage on the upstream side of the injection nozzle, the $NO_x$ reduction efficiency is appreciably improved. Moreover, in this configuration, although a distance between the injection nozzle and the reduction catalytic converter becomes shorter, by virtue of provision of the diffusion member, the liquid reducing agent can be sufficiently diffused into and mixed with the exhaust gas.

BRIEF DESCRIPTION OF THE DRAWINGS

FIG. 5 are graphical views indicating simulation results of a vortex generation state, in which 5A is a view illustrating a case where the ring member in FIG. 3 is used, and 5B is a view illustrating another case where the ring member in FIG. 4 is used; and FIG. 6 are graphical views indicating simulation results of a distribution state of a liquid reducing agent at an inlet of a reduction catalytic converter, in which 6A is a view illustrating a case where diffusing means is not disposed, 6B is a view illustrating another case where the ring member in FIG. 3 is used, and 6C is a view illustrating a further case where the ring member in FIG. 4 is used.

DESCRIPTION OF THE PREFERRED EMBODIMENTS

Hereunder, there will be described a muffling apparatus having an exhaust emission purifying function in accordance with the present invention, based on the appended drawings.

Figure 1:
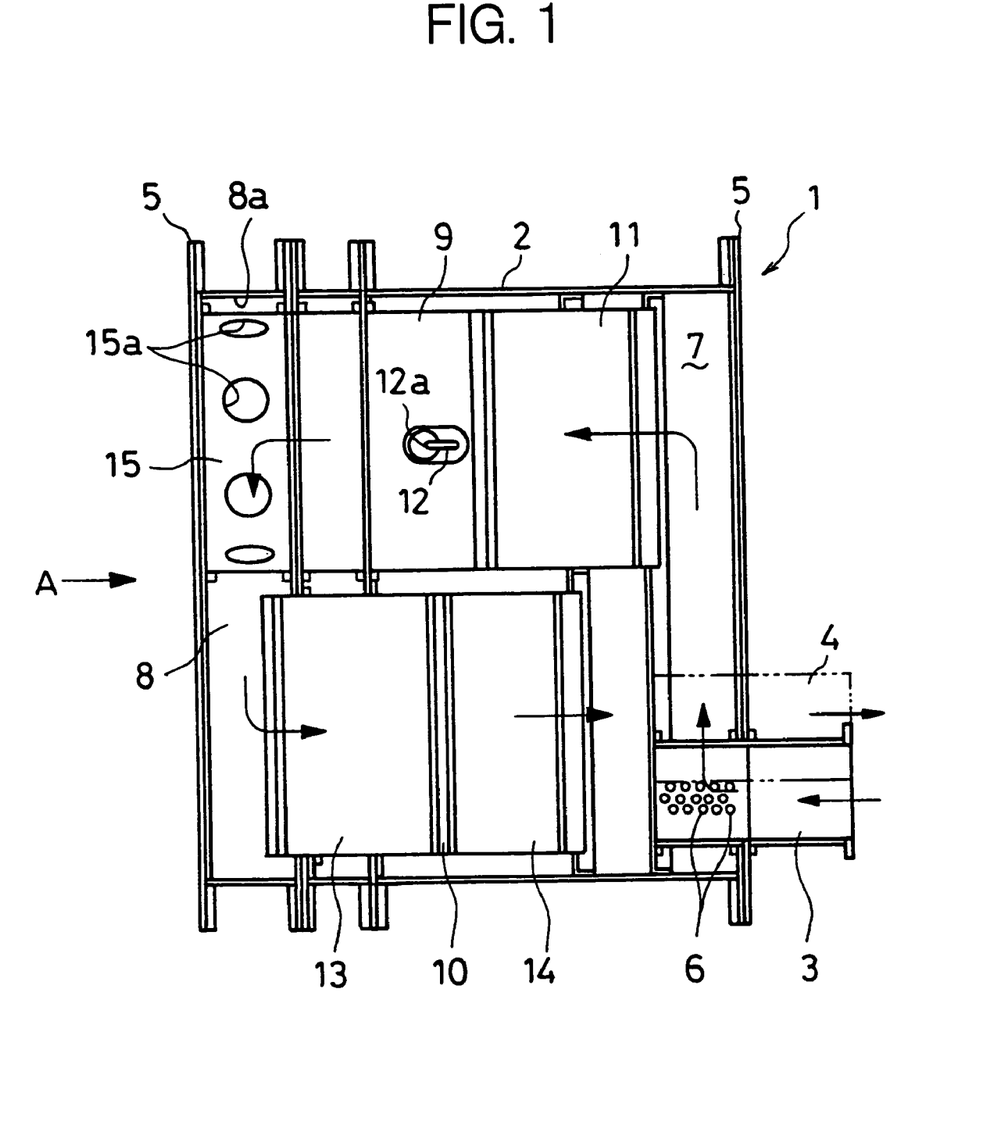
FIG. 1 is a diagrammatic view illustrating an internal structure of a muffling apparatus having an exhaust emission purifying function, according to one embodiment the present invention.

FIG. 1 is a diagram showing an internal structure of a muffling apparatus provided with an exhaust emission purifying function according to one embodiment of the present invention.

In FIG. 1, in the muffling apparatus 1 in this embodiment, on a right-hand side face (in the figure) of a case 2, an exhaust gas inlet portion 3 is disposed and an exhaust gas discharge portion 4 (shown by two-dot chain line in the figure) is disposed on a front side (in the figure) of the exhaust gas inlet portion 3. Further, on an outer periphery of the case 2, a fitting flange portion 5 is disposed for fixing the muffling apparatus 1 to an appropriate position of a vehicle. To the inside of the case 2, there are formed an extension chamber 7 which is communicated with the exhaust gas inlet portion 3 via a large number of holes 6 formed on the exhaust gas inlet portion 3, a turning portion 8 for turning the exhaust gas flow back at a side face thereof opposite to the extension chamber 7, an upstream side exhaust gas flow passage 9 which communicates the extension chamber 7 with the turning portion 8, and a downstream side exhaust gas flow passage 10 which communicates the turning portion 8 with the exhaust gas discharge portion 4.

Figure 2:
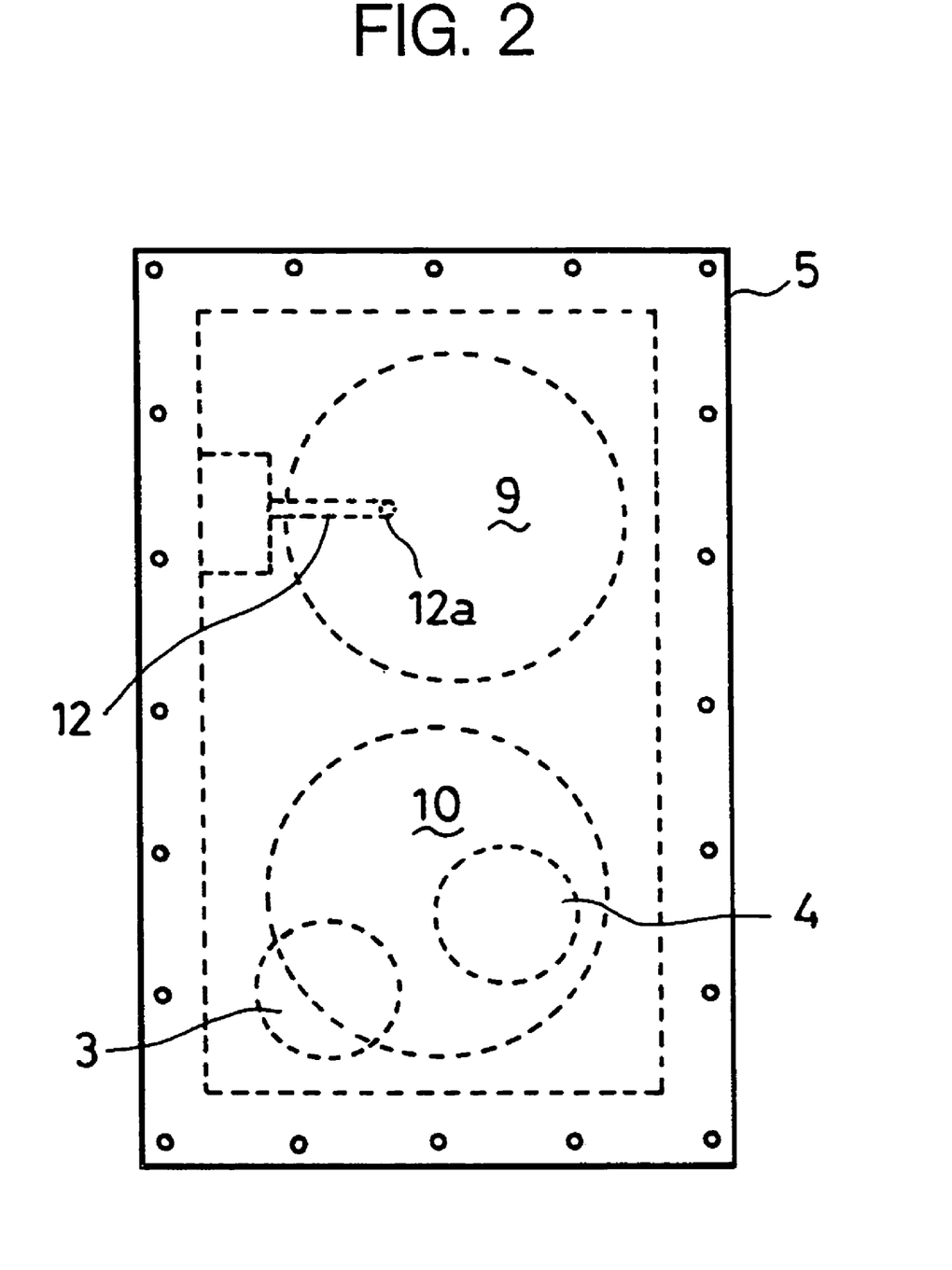
FIG. 2 is a diagrammatic view illustrating a positional relation of an exhaust gas inlet portion, an exhaust gas discharge portion, an injection nozzle, an upstream side exhaust gas flow passage and a downstream side exhaust gas flow passage, viewed from an arrow A direction of FIG. 1.

On the upstream side exhaust gas flow passage 9, there are disposed respectively an oxidation catalytic converter 11 for oxidizing NO in the exhaust gas into $NO_2$, and an injection nozzle 12 for injection-supplying a liquid reducing agent, for example, the urea aqueous water or the like, to a downstream side of the oxidation catalytic converter 11. As shown in FIG. 2, the injection nozzle 12 is disposed to protrude toward a passage center portion from a passage wall, and a nozzle opening 12a thereof is positioned on a front side of the passage center position. Thus, the protrusion length of the injection nozzle 12 is made shorter and rigid, so that the damage to the injection nozzle 12 due to the vehicle body oscillation or the like is prevented, and also, so that the heat capacity of the injection nozzle 12 is suppressed and the urea accumulation on an inner wall thereof is suppressed, thereby preventing the nozzle clogging. Further, on the downstream side exhaust gas flow passage 10, there are disposed respectively a $NO_x$ reduction catalytic converter 13 for reductively purifying $NO_x$ with the liquid reducing agent, and a reducing agent oxidation catalytic converter 14 for oxidation-purifying the liquid reducing agent which has passed through the $NO_x$ reduction catalytic converter 13, on a downstream side of the $NO_x$ reduction catalytic converter 13.

Figure 3:
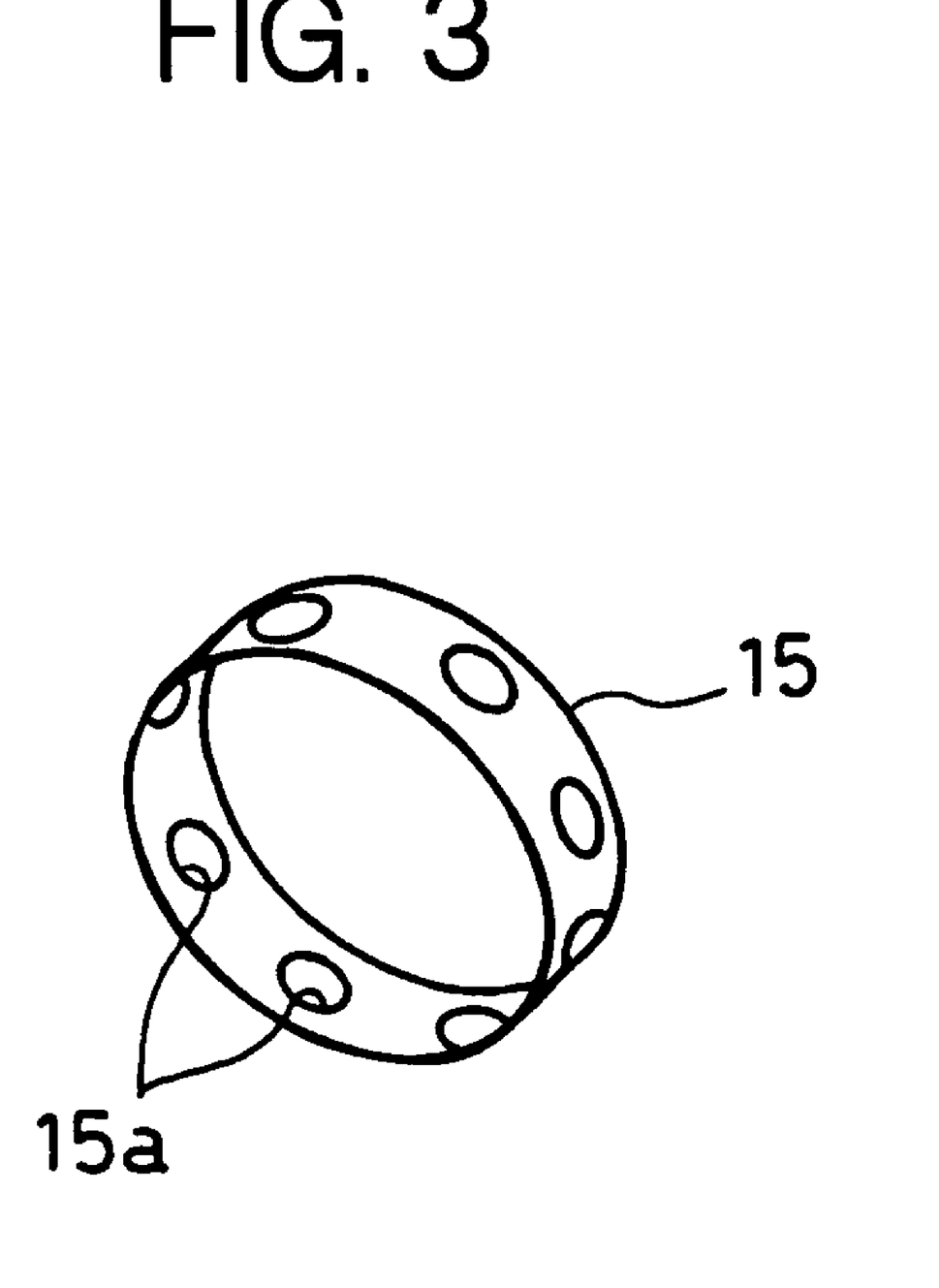
FIG. 3 is a diagrammatic view illustrating a ring member in the above embodiment of the present invention.

Further, on a portion of the turning portion 8, which is communicated with the upstream side exhaust gas flow passage 9, there is disposed a ring member 15 shown in FIG. 3 serving as a diffusing member which generates the vortex traveling in a vertical direction to the exhaust gas flow at the turning portion 8 to diffuse the liquid reducing agent. The ring member 15 includes apertures 15a as a plurality of opening portions at equidistant intervals along a circumferential direction thereof as shown in FIG. 3, and leads, via these apertures 15a, the exhaust gas flowing into the turning portion 8 from the upstream side exhaust gas flow passage 9 toward a turning portion wall face 8a extending substantially in parallel with a flow direction of the exhaust gas.

FIG. 2 shows a positional relation of the exhaust gas inlet portion 3, the exhaust gas discharge portion 4, the injection nozzle 12, the upstream side exhaust gas flow passage 9 and the downstream side exhaust gas flow passage 10, viewed from an arrow A direction of FIG. 1.

In the muffling apparatus 1 of this embodiment, as shown by arrows in FIG. 1, the exhaust gas having entered from the exhaust gas inlet portion 3 flows into the extension chamber 7 via the holes 6, and is flown through the upstream side exhaust gas flow passage 9, the turning portion 8 and the downstream side exhaust gas flow passage 10 in this sequence, to be discharged from the exhaust gas discharge portion 4. At this time, NO in the exhaust gas is oxidized into $NO_2$ by the oxidation catalytic converter 11 on the upstream side exhaust gas flow passage 9, and thereafter, the liquid reducing agent is injection-supplied into the exhaust gas from the injection nozzle 12. The exhaust gas containing the liquid reducing agent is injected from the apertures 15a of the ring member 15 at the turning portion 8 toward the turning portion wall face 8a substantially in parallel to the flow direction of the exhaust gas from the upstream side exhaust gas flow passage 9. As a result, the exhaust gas flow along the wall face 8a is generated, so that the vortex in the vertical direction is generated in a portion which is communicated with the downstream side exhaust gas flow passage 10, below the ring member 15 of the turning portion 8, and the liquid reducing agent is effectively diffused and mixed into the exhaust gas, so that the distribution state of the liquid reducing agent in the exhaust gas becomes even. Accordingly, the liquid reducing agent evenly flows into the $NO_x$ reduction catalytic converter 13 on the downstream side exhaust gas flow passage 10. Then, $NO_x$ in the exhaust gas is reductively purified with the liquid reducing agent by the $NO_x$ reduction catalytic converter 13, and after the residual liquid reducing agent is oxidation-purified by the reducing agent oxidation catalytic converter 14, the exhaust gas is discharged from the exhaust gas discharge portion 4.

According to the muffling apparatus 1 of the above configuration, the vortex is generated in the exhaust gas flow which travels from the turning portion 8 toward the $NO_x$ reduction catalytic converter 13 on the downstream side exhaust gas flow passage 10, so that the liquid reducing agent is effectively diffused and mixed into the exhaust gas. Therefore, the distribution state of the liquid reducing agent in the exhaust gas becomes even, so that the liquid reducing agent evenly flows into the $NO_x$ reduction catalytic converter 13. Accordingly, the reduction purification of $NO_x$ in the $NO_x$ reduction catalytic converter 13 is efficiently performed, thereby improving the $NO_x$ reduction performance.

Further, by disposing the oxygen catalytic converter 11 and the reducing agent oxygen catalytic converter 14, the distance between the injection nozzle 12 and the $NO_x$ reduction catalytic converter 13 is made shorter. However, the liquid reducing agent can be distributed sufficiently in even due to the diffusion action by the ring member 15, and therefore, there is no problem in such a short distance. Incidentally, the oxygen catalytic converter 11 and the reducing agent oxygen catalytic converter 14 may be disposed if necessary.

Figure 4:
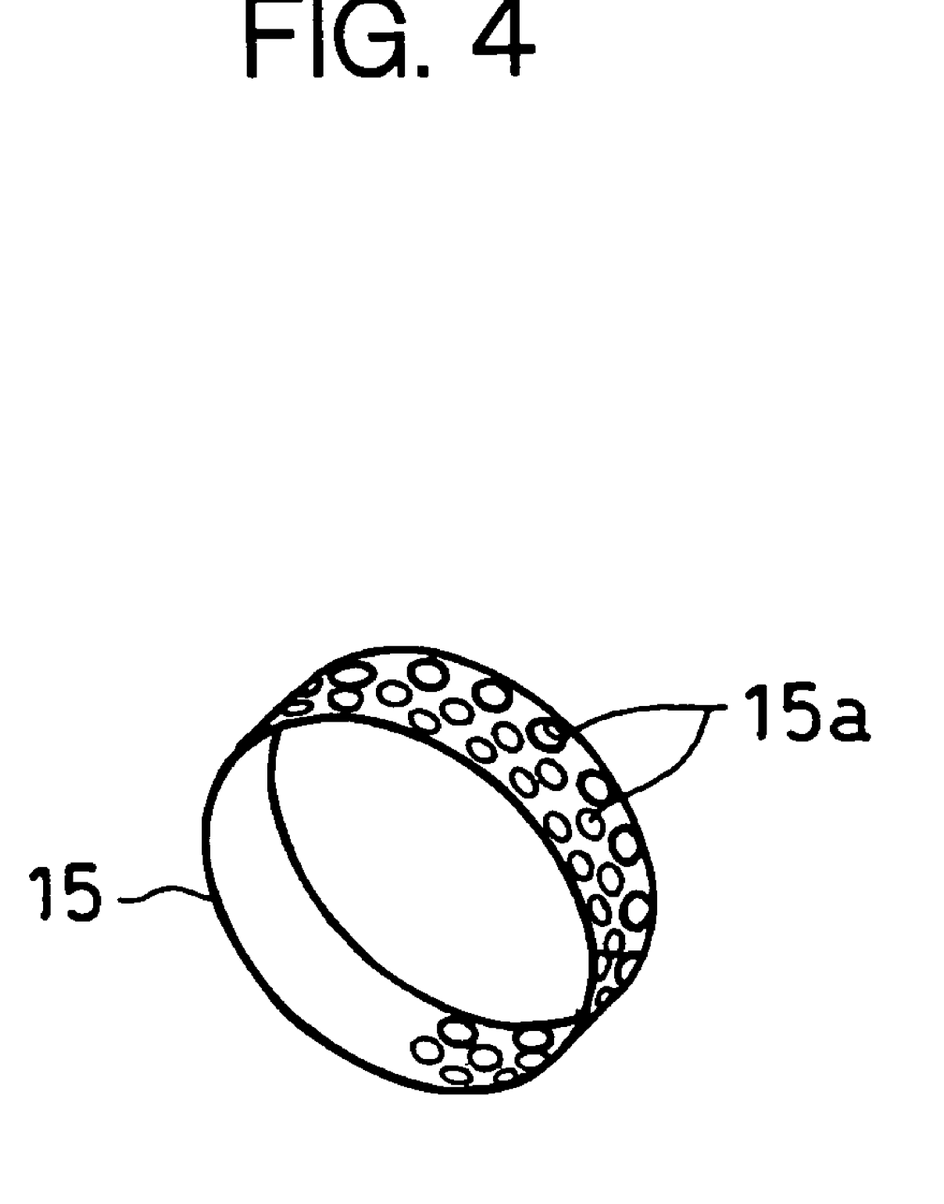
FIG. 4 is a diagrammatic view illustrating another example of the ring member.

The apertures 15a may be formed to be arranged in a circumferential direction of the ring member 15 at a non-uniform distribution as shown in FIG. 4, and not formed to be equidistantly arranged on the entire circumference of the ring member 15 as shown in FIG. 3. In this case, the plurality of apertures 15a are typically arranged on one side of the circumference of ring 15, e.g., in a substantially circumferentially half portion of the ring member 15 as will be obvious from the illustration of FIG. 4. Moreover, the ring member 15 is set in the turning portion 8 so that the apertures 15a are positioned on a side opposite to an attachment position side of the injection nozzle 12 for the liquid reducing agent. As a result, the flow of the exhaust gas injected via the apertures 15a of the ring member 15 is given with the directivity, and therefore, the vortex can be generated more effectively compared with the case where the apertures 15a are formed at an equidistant interval on the entire circumference. Accordingly, the diffusion and mixing action of the liquid reducing agent is promoted, so that the distribution of the liquid reducing agent is made more even, and the $NO_x$ reduction efficiency by the NO reduction catalytic converter 13 is improved, thereby further improving the $NO_x$ reduction performance. Incidentally, the configuration may be such that not only the apertures 15a are formed and arranged at a non-uniform distribution in the circumferential direction, but also the diameters of the apertures 15a may be intentionally varied from each other.

Figure 5A:
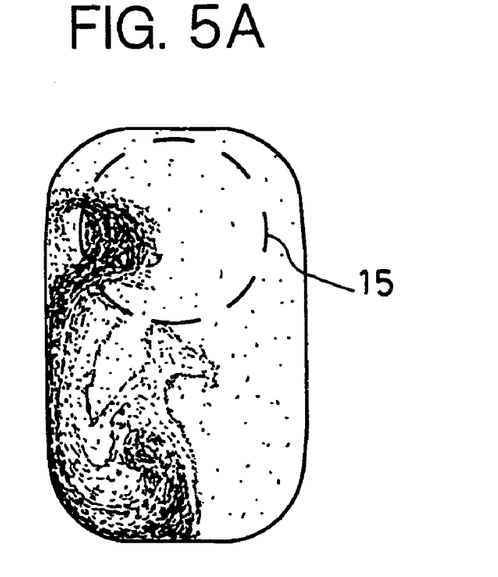
Figure 5B:
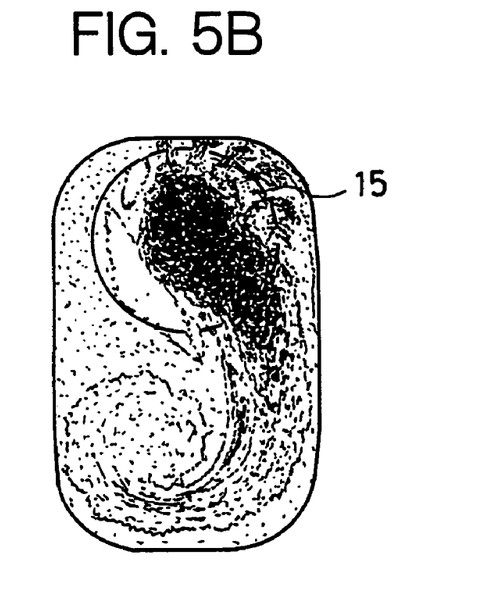

FIG. 5 indicates simulation results of the same operating state in which a vortex generation state in the case of using the ring member of FIG. 3 which is formed with the apertures at an equidistant spacing, is compared with a vortex generation state in the case of using the ring member of FIG. 4 formed with the apertures arranged at non-uniform distribution in the circumferential direction. FIG. 5A indicates the case of the ring member in FIG. 3, and FIG. 5B indicates the case of the ring member in FIG. 4.

As is obvious from the indications of FIG. 5, it is to be understood that the large vortex is generated below the ring member 15 in the case of using the ring member in FIG. 4, compared with the case of using the ring member in FIG. 3, and accordingly, the diffusion and mixing of the liquid reducing agent against the exhaust gas is performed satisfactorily.

Figure 6A:
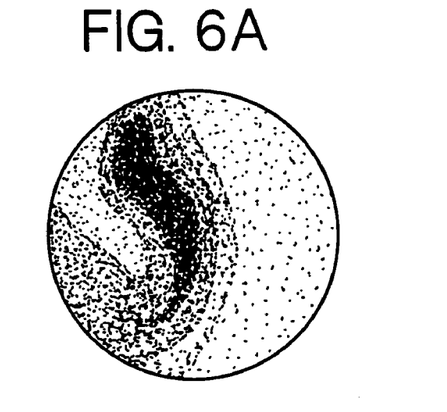
Figure 6B:
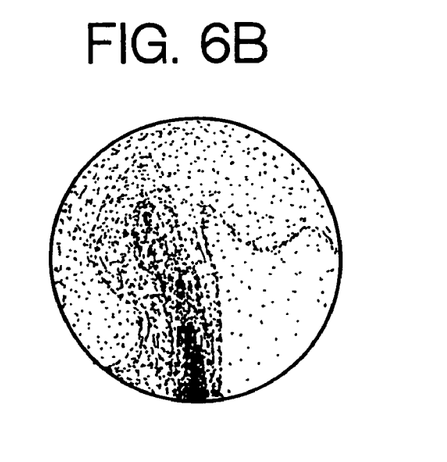
Figure 6C:
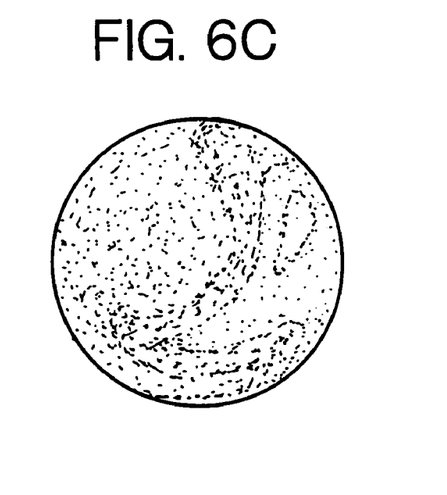

FIG. 6 indicates simulation results of the same operating state in which distribution states of the liquid reducing agent at an inlet of the $NO_x$ reduction catalytic converter 13 are compared with each other, for the case where the diffusing member is not used, the case of using the ring member of FIG. 3 and the case of using the ring member of FIG. 4. FIG. 6A indicates the case where the diffusing member is not used, FIG. 6B indicates the case of using the ring member in FIG. 3, and FIG. 6C indicates the case of using the ring member in FIG. 4. Incidentally, in the figure, portions deep in color show the high concentration of the liquid reducing agent.

As is obvious from FIG. 6, the distribution state of the liquid reducing agent is made more even in the case where the ring member serving as the diffusing member is used, compared with the case where no diffusing member is used. Further, even in the case where the ring member is used, the distribution state of the liquid reducing agent is made more even in the case of using the ring member of FIG. 4, compared with the case of using the ring member of FIG. 3.

We claim:

1. A muffling apparatus having an exhaust emission purifying function, the apparatus being formed with a turning portion in an inside of a flow passage of an exhaust gas, and comprising at least:
   an injection nozzle, disposed in the flow passage of the exhaust gas on an upstream side of the turning portion, for injection-supplying a liquid reducing agent; and
   a reduction catalytic converter, disposed in the flow passage of the exhaust gas on a downstream side of the turning portion, for reductively purifying nitrogen oxides with the liquid reducing agent, and
   a diffusing member for generating a vortex flow of gas traveling in a vertical plane of the turning portion to cause diffusion of the liquid reducing agent into the exhaust gas flow, the diffusing member including a ring member on which a plurality of opening portions are formed, the opening portions arranged on a side of the ring member and disposed substantially in parallel with a flow direction of the exhaust gas entering into the turning portion from the flow passage of the exhaust gas on the upstream side of the turning portion,
   wherein the exhaust gas entering into the turning portion is injected in outward directions via the opening portions to thereby generate the vortex flow.

2. The muffling apparatus having an exhaust emission purifying function according to claim 1, wherein the ring member leads the exhaust gas which flows into the turning portion from the upstream side exhaust gas flow passage, toward a direction in which a turning portion wall face extends substantially in parallel with a flow direction of the exhaust gas.

3. The muffling apparatus having an exhaust emission purifying function according to claim 1, wherein the plurality of opening portions are formed to be arranged at a non-uniform distribution in the circumferential direction of the ring member.

4. The muffling apparatus having an exhaust emission purifying function according to claim 1, wherein the plurality of opening portions are formed to have different hole-diameters from each other.

5. The muffling apparatus having an exhaust emission purifying function according to claim 1, wherein an oxidation catalytic converter is provided on an upstream side of the injection nozzle, for oxidizing nitrogen monoxide into nitrogen dioxide, and a reducing agent oxidation catalytic converter is provided on a downstream side of the reduction catalytic converter, for oxidation-purifying the liquid reducing agent which has passed through the reduction catalytic converter.

* * * * *